(12) United States Patent
Ehlers et al.

(10) Patent No.: US 10,336,456 B2
(45) Date of Patent: Jul. 2, 2019

(54) FOLDABLE SEAT BENCH

(71) Applicant: AIRBUS OPERATIONS GMBH, Hamburg (DE)

(72) Inventors: Bernd Ehlers, Hamburg (DE); Stefan Behrens, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 15/465,949

(22) Filed: Mar. 22, 2017

(65) Prior Publication Data
US 2017/0275000 A1    Sep. 28, 2017

(30) Foreign Application Priority Data

Mar. 23, 2016   (EP) .................................... 16162029

(51) Int. Cl.
*B64D 11/06*    (2006.01)

(52) U.S. Cl.
CPC ...... *B64D 11/0639* (2014.12); *B64D 11/0696* (2013.01)

(58) Field of Classification Search
CPC .. B64D 11/0639; B64D 11/0696; B64D 9/00; B64D 11/00; B64D 11/0023; B64D 11/0601; B60N 2002/363; B60N 2/3097; B60N 2/3065; B60N 2/3063; B60N 2/3061; B60N 2/3031; B60N 2/3029;
(Continued)

(56) References Cited

U.S. PATENT DOCUMENTS

| 3,603,638 | A |   | 9/1971  | McGregor et al. |            |
|-----------|---|---|---------|-----------------|------------|
| 4,621,864 | A | * | 11/1986 | Hill .............|  B60N 2/242 |
|           |   |   |         |                 | 297/115    |

(Continued)

FOREIGN PATENT DOCUMENTS

| EP |  2 939 920 A1  |   | 11/2015 |            |
|----|----------------|---|---------|------------|
| FR |  2959970 A3    | * | 11/2011 | B60N 2/2356 |

OTHER PUBLICATIONS

Machine translation of foreign reference FR 2959970, obtained from http://translationportal.epo.org/emtp/translate/?ACTION=description-retrieval&COUNTRY=FR&ENGINE=google&FORMAT=docdb&KIND=A3&LOCALE=en_EP&NUMBER=2959970&OPS=ops.epo.org/3.2&SRCLANG=fr&TRGLANG=en (last accessed on Mar. 28, 2018) (Year: 2018).*

(Continued)

*Primary Examiner* — Theodore V Adamos
(74) *Attorney, Agent, or Firm* — Jenkins, Wilson, Taylor & Hunt, P.A.

(57) ABSTRACT

A foldable seat bench comprises a seat, a seat area and a backrest, and a carrier arrangement comprising a carrier element carrying the seat and at least one leg. The backrest is movable between a deployed position extending at an angle of approximately 70° to 110° relative to the seat area and a stowed position extending at an angle of approximately 0° to 20° relative to the seat area. The leg is foldable relative to the carrier element between a unfolded position and a folded position. The foldable seat bench comprises a first locking mechanism which, in a locking state, is adapted to lock the backrest of the seat in both its deployed position and its stowed position, and a second locking mechanism which, in a locking state, is adapted to lock the leg of the carrier arrangement in both its unfolded position and its folded position.

15 Claims, 11 Drawing Sheets

(58) Field of Classification Search
CPC ...... B60N 2/3002; B60N 2/302; B60N 2/206; B60N 2/10
USPC ...... 297/334, 325, 411.39; 296/65.09, 65.08, 296/65.17; 244/118.6, 112 R
See application file for complete search history.

(56) References Cited

U.S. PATENT DOCUMENTS

| | | | | |
|---|---|---|---|---|
| 4,655,501 | A * | 4/1987 | Ishigami | B60N 2/767 297/113 |
| 5,195,795 | A * | 3/1993 | Cannera | B60N 2/0292 296/65.09 |
| 5,707,112 | A * | 1/1998 | Zinn | B60N 2/232 297/362.14 |
| 6,203,101 | B1 * | 3/2001 | Chou | A47C 7/543 297/115 |
| 6,382,491 | B1 * | 5/2002 | Hauser | B60N 2/045 296/65.05 |
| 6,540,295 | B1 * | 4/2003 | Saberan | B60N 2/206 297/283.3 |
| 6,698,838 | B2 * | 3/2004 | Kain | A47C 7/543 297/411.32 |
| 7,938,485 | B1 * | 5/2011 | Perciballi | B60N 2/24 297/216.1 |
| 8,070,233 | B2 * | 12/2011 | Schumacher | B60N 2/3047 297/411.32 |
| 9,016,793 | B2 * | 4/2015 | Roeglin | A47C 7/543 297/411.32 |
| 9,067,517 | B1 | 6/2015 | Roeglin et al. | |
| 9,820,575 | B2 * | 11/2017 | Ham | A47C 1/124 |
| 2001/0040400 | A1 * | 11/2001 | Kamida | B60N 2/0292 297/354.13 |
| 2003/0209929 | A1 * | 11/2003 | Muin | B60N 2/3009 297/331 |
| 2006/0006703 | A1 * | 1/2006 | Harland | B60N 2/3011 297/170 |
| 2006/0103174 | A1 * | 5/2006 | Queveau | B60N 2/3011 297/15 |
| 2007/0194615 | A1 * | 8/2007 | Fischer | B60N 2/02 297/354.12 |
| 2007/0236067 | A1 * | 10/2007 | Nathan | B60N 2/0224 297/378.12 |
| 2008/0129072 | A1 * | 6/2008 | Epaud | B60N 2/06 296/66 |
| 2011/0042514 | A1 | 2/2011 | Ehlers et al. | |
| 2012/0306252 | A1 * | 12/2012 | Ligonniere | B64D 11/06 297/354.1 |
| 2013/0062903 | A1 * | 3/2013 | Mather | B60N 2/2356 296/64 |
| 2014/0183920 | A1 * | 7/2014 | Hage-Hassan | B60N 2/3013 297/378.1 |
| 2015/0091318 | A1 * | 4/2015 | Bohner | B60N 2/767 296/1.09 |
| 2015/0307179 | A1 | 10/2015 | Ehlers et al. | |
| 2017/0275002 | A1 * | 9/2017 | Ehlers | B64D 11/0696 |

OTHER PUBLICATIONS

Extended European Search Report for Application No. 16162029 dated Sep. 5, 2016.

* cited by examiner

FOLDABLE SEAT BENCH

CROSS-REFERENCE TO RELATED APPLICATION

This application claims priority to European Patent Application EP 16 162 029.9, filed Mar. 23, 2016, the entire disclosure of which is incorporated by reference herein.

TECHNICAL FIELD

The present disclosure relates to a foldable seat bench which is in particular suitable for installation in a cabin of a passenger vehicle, in particular an aircraft cabin.

BACKGROUND

When operating an aircraft, it may be desirable to flexibly change a cargo-to-passenger ratio an aircraft cabin depending on current demands. In other words, it may be desired to flexibly change the configuration of at least an area of an aircraft cabin to allow for a transport of either passengers or cargo items, thus flexibly adapting the respective transport capacities of the aircraft. Furthermore, it may be desired to adjust the configuration of the aircraft cabin to particular transportation needs, for example the transport of a disabled person in a lying position.

For transporting passengers, an aircraft cabin needs to be equipped with seat arrangements. However, in case it is desired to use an area of the aircraft cabin partially or completely for transporting cargo items these seat arrangements occupy valuable space. Furthermore, the seat arrangements represent obstacles which limit possible dimensions of cargo items to be transported. Therefore, for allowing for a change from passenger to cargo transport, so far the complete seat arrangements have to be removed from a respective aircraft cabin area. This involves either a manual detachment of single seat arrangements from fastening rails and transporting them out of the aircraft or a complete removal of large palettes to which a plurality of seat arrangements are attached. As major disadvantages, these solutions are very time consuming and require seat arrangements to be present and/or storable at airports for reconfiguring the aircraft cabin area. Also, during loading and unloading of the seat arrangements these are exposed to all weather conditions.

EP 2 939 920 A1 and US 2015/0307179 A1 disclose a deployable floor panel arrangement for an aircraft cabin area which comprises a substantially planar floor panel with at least one foldable seat arrangement mounted thereto. The seat arrangement comprises at least one backrest which is configured to be movable is relative to the seating area between a stowed position in which it extends at an angle of approximately 0° to 40° to the plane of the floor panel and a deployed position in which it extends at an angle of approximately 80° to 180° to the plane of the floor panel. The seat arrangement further comprises at least one leg arrangement which is configured to be foldable in such a way that during the folding the seating area is moved towards the floor panel in a pivoting motion. The pivoting motion of the seating area and the pivoting motion of the backrest are oriented oppositely to each other.

For reconfiguring an aircraft cabin area equipped with the deployable floor panel arrangement for cargo transport, the floor panels with the seat arrangements in their folded configuration being mounted thereto are pivoted towards a sidewall of the aircraft cabin area until they extend at an angle of 90° to a floor area of the aircraft cabin area. The folded seat arrangements then are located between the floor panel and the sidewall of the aircraft cabin area, while the floor panel face the inside of the aircraft cabin area with its plan are underside which previously rested on the floor area. Thus, the floor panel defines a continuous and planar side wall facing the inside of the aircraft cabin area without providing any obstacles or projections.

SUMMARY

The disclosure herein is directed to an object of providing a foldable seat bench which allows for a fast and flexible change of the cargo-to-passenger ratio of the cabin of a passenger vehicle, in particular an aircraft cabin, and which can be folded and unfolded particularly easily and reliably.

This object is achieved by a foldable seat bench as disclosed herein.

A foldable seat bench comprises a seat which has a seat area and a backrest. The foldable seat bench further comprises a carrier arrangement which has a carrier element carrying the seat and at least one leg. The carrier element may be designed as a rigid element and may define a seat pan that is suitable to support the seat area of the seat.

The backrest is movable relative to the carrier element between a deployed position and a stowed position. In its deployed position, the backrest extends at an angle of approximately 70° to 110° relative to the seat area. Thus, in its deployed position, the backrest extends substantially perpendicular relative to the seat area. To the contrary, in its stowed position, the backrest extends at an angle of approximately 0° to 20° relative to the seat area. Thus, in its stowed position, the backrest extends substantially parallel relative to the seat area. By moving the backrest from its deployed position into its stowed position, the installation space occupied by the seat and in particular the installation height of the seat is considerably reduced. During normal use of the seat bench, the backrest may be pivotable relative to the carrier element and hence the seat area between an upright position and a reclined position about an angle of approximately 20° in order to enhance the comfort of a person sitting on the seat bench. It is, however, also conceivable that, during normal use of the seat bench, the backrest is not movable relative to the carrier element and seat area.

The leg is foldable relative to the carrier element between an unfolded position and a folded position. When the foldable seat bench is mounted in a cabin of a passenger vehicle, the leg, in its unfolded position, supports the carrier element at a first distance from a floor of the passenger vehicle cabin. The leg then may extend at an angle of approximately 50° to 130° relative to the carrier element. To the contrary, when the leg is arranged in its folded position, the carrier element is arranged at a second distance from the floor of the passenger cabin vehicle which is smaller than the first distance. The leg then may extend at an angle of approximately 0° to 40° and in particular at least partially substantially parallel relative to the carrier element. Thus, by folding the leg of the carrier arrangement, the installation space occupied by the seat and in particular the installation height of the seat is further reduced.

When the backrest of the seat is arranged in its stowed position and the leg of the carrier arrangement is arranged in its folded position, the seat bench is no longer usable for seating. However, the dimensions of the seat bench are significantly reduced, in particular in a direction perpendicular to the floor of a vehicle passenger cabin accommodating the seat bench. Accordingly, the folding of the seat bench clears a considerable amount of space within the passenger vehicle cabin which may be used to hold other goods, such as for example cargo goods instead. Therefore, when a reconfiguration from passenger to cargo transport within the passenger vehicle cabin is desired, additional space can be cleared for transporting cargo goods without a need for removing the complete seat bench from the passenger vehicle cabin by simply folding the seat bench. Hence, the seat bench may be permanently installed within the vehicle passenger cabin while still allowing a fast and flexible change of the cargo-to-passenger ratio of the vehicle passenger cabin. Furthermore, when the backrest is arranged in its stowed position, a backside of the backrest may be used as a support for a stretcher. Thus, by folding the seat bench, space for the transportation of a disabled person may be provided.

The foldable seat bench further comprises a first locking mechanism which, in a locking state, is adapted to lock the backrest of the seat in both its deployed position and its stowed position. Thus, the foldable seat bench is equipped with a single first locking mechanism which allows locking the backrest of the seat in either its deployed position or its stowed position, as required. Furthermore, a second locking mechanism is provided which, in a locking state, is adapted to lock the leg of the carrier arrangement in both its unfolded position and its folded position. Thus, the foldable seat bench is also equipped with a single second locking mechanism which allows locking the leg of the carrier arrangement either in its unfolded position or its folded position, as required. The seat bench consequently may be folded and unfolded particularly quickly and easily and distinguishes by a high operational reliability. Hence, when the foldable seat bench is installed in an aircraft, the folding process may be performed by the cabin or ground crew without the involvement of additional maintenance personnel.

In a preferred embodiment of the foldable seat bench, the seat further comprises an armrest which is movable relative to the carrier element between a deployed position and a stowed position. In its deployed position, the armrest is arranged at a first distance from the carrier element. Preferably, in its deployed position, the armrest extends at the first distance from the carrier element substantially parallel to the seat area. In its stowed position, the armrest may be arranged at a second distance from the carrier element which is smaller than the first distance. In particular, in its stowed position, the armrest may extend substantially parallel to the seat area at a second distance, which is selected such that the armrest is arranged adjacent to a side face of the backrest arranged in its stowed position. Moving the armrest from its deployed position into its stowed position prevents the armrest from substantially or at all protruding beyond a backside of the backrest when the backrest is arranged in its stowed position. Consequently, the dimensions of the seat bench in its folded state are limited, while a more or less plane surface may be defined by the backside of the backrest and an arm supporting surface of the armrest which preferably extend substantially coplanar with each other when the backrest and the armrest are arranged in their stowed position.

The first locking mechanism may comprise a first actuator which, upon actuation, is adapted to unlock the first locking mechanism and which is arranged in the region of face of the foldable seat bench which faces an aisle of the cabin of a passenger vehicle, when the foldable seat bench is installed in the cabin of a passenger vehicle. Thus, the first locking mechanism is easily accessible for a person, in particular a cabin or ground crew member standing in the aisle of the passenger vehicle cabin. Additionally or alternatively, the second locking mechanism may comprise a second actuator which, upon actuation, is adapted to unlock the second locking mechanism and which is arranged in the region of face of the foldable seat bench which faces an aisle of the cabin of a passenger vehicle, when the foldable seat bench is installed in the cabin of a passenger vehicle. Finally, also the third locking mechanism may comprise a third actuator which, upon actuation, is adapted to unlock the third locking mechanism and which is arranged in the region of face of the foldable seat bench which faces an aisle of the cabin of a passenger vehicle, when the foldable seat bench is installed in the cabin of a passenger vehicle. The first, the second and/or the third actuator may be covered or hidden in order to prevent unauthorized use.

Basically, the foldable seat bench may comprise only one seat. Preferably, however, the seat bench is equipped with a plurality of seats, for example three seats. The seat bench then is in particular suitable for being arranged in the passenger cabin of a single aisle aircraft. In one embodiment of a seat bench which is equipped with a plurality of seats, the backrests of the seats are coupled to each other so as to be movable relative to the carrier element between their deployed position and their stowed position simultaneously. Similarly, the armrests of the seats may be coupled to each other so as to be movable relative to the carrier element between their deployed position and their stowed position simultaneously. In this embodiment of the seat bench, all backrests can be moved between their deployed position and their stowed position in a single handling step. As a result, the folding/unfolding process can be accomplished particularly easily and quickly.

Alternatively, in another embodiment of a seat bench which is equipped with a plurality of seats, the backrests of the seats are movable relative to the carrier element between their deployed position and their stowed position independently from each other. Similarly, the armrests of the seats may be movable relative to the carrier element between their deployed position and their stowed position independently from each other. Hence, folding or unfolding the entire seat bench, i.e. deploying all backrests and/or armrests requires multiple handling steps. However, a particularly flexible use of the seat bench is made possible, since one or more backrests and/or armrests may be stowed while other backrests and/or armrests may be maintained in the deployed position. As a result, a part of the seat bench may still be used for seating purposes, while the space which is freed by stowing individual backrests and/or armrests may be used for storing goods or the like.

The first locking mechanism may be designed in such a manner that, upon actuation of the first actuator of the first locking mechanism, all backrests of the plurality of seats are unlocked and thus movable between the deployed position and their stowed position. Thus, only a single actuation step has to be carried out by an operator for unlocking all backrests. Consequently, a seat bench which comprises a plurality of seats may be folded and unfolded particularly quickly and easily.

The carrier arrangement of the foldable seat bench may comprise a plurality of legs. The second locking mechanism then preferably is designed in such a manner that, upon actuation of the second actuator of the second locking mechanism, all legs are unlocked and thus movable between their unfolded position and their folded position. Thus, only a single actuation step is required in order to unlock all legs which further simplifies the folding/unfolding process.

Finally, the third locking mechanism may be designed in such a manner that, upon actuation of the third actuator of the third locking mechanism, all armrests of the plurality of seats are unlocked and thus movable between the deployed position and their stowed position. It is, however, also conceivable that the third locking mechanism comprises a plurality of third actuators, wherein one third actuator may be associated with each armrest.

The first locking mechanism may be designed in the form of mechanical locking mechanism or electric locking mechanism. Similarly, the second locking mechanism may be designed in the form of mechanical locking mechanism or electric locking mechanism. Further, also the third locking mechanism may be designed in the form of mechanical locking mechanism or electric locking mechanism.

In a preferred embodiment wherein the first locking mechanism is designed in the form of a mechanical locking mechanism, the first locking mechanism comprises a first latching element which may be attached to the carrier element and which, when being arranged in a latching position, is adapted to latch with a complementary first holding element provided on the backrest in order to lock the backrest in both its deployed position and its stowed position. The first latching element of the first locking mechanism may comprise two opposing latching surfaces each of which is adapted to interact with the complementary first holding element. The first holding element may be designed in the form of a bolt which extends from a side face of the backrest and which, upon moving the backrest between its deployed position and its stowed position, travels along a guiding recess provided in the region of a side face of the seat in the carrier element in order to allow for the backrest, in its stowed position, being arranged in close contact with the seat area of the seat.

Preferably, the first latching element is biased into its latching position. A spring element may be provided in order to apply a biasing force onto the first latching element. The biasing force acting on the first latching element may bias the first latching element towards the guiding recess into engagement with the first holding element.

In order to move the backrest between its deployed position and its stowed position, the backrest may be manually moved. As a result, the first holding element may travel along the guiding recess formed in the carrier element. While traveling along the guiding recess, the first holding element may push the first latching element in a direction away from the guiding recess against the biasing force acting on the first latching element and thereby may disengage from a first latching surface of the first latching element. However, as soon as the backrest has reached its final either deployed or stowed position and hence the holding element has reached its corresponding final position in the guiding recess, the first latching element, by the biasing force acting on the first latching element, again may be moved towards the guiding recess such that a second latching surface of the first latching element may come into engagement with the first holding element.

The second locking mechanism may comprise a second latching element which is attached to the leg and which, when being arranged in a latching position, is adapted to latch with a complementary second holding element provided on the carrier element in order to lock the leg in both its unfolded position and its folded position. The second latching element of the second locking mechanism may be substantially pin-shaped and configured to latch with a complementary second holding element which comprises an opening for receiving the pin-shaped second latching element. When the second latching element is received in the opening of the second holding element, movement of the leg relative to the carrier element is prevented. To the contrary, when the second latching element is not engaged with the opening of the second holding element, the leg is free to pivot relative to the carrier element.

Preferably, the second latching element is biased into its latching position. The biasing force acting on the second latching element may bias the second latching element towards the opening provided in the second holding element so as to bring the second latching element into engagement with the second holding element. A spring element for biasing the second latching element into its latching position may be designed in the form of a spiral spring which surrounds the pin-shaped second latching element and which acts on a projection radially extending from an outer circumference of the pin-shaped second latching element.

In order to move the leg between from unfolded position to its folded position, the second locking mechanism may be unlocked and a pushing force may be applied to the carrier element. As a result, the leg may be pivoted relative to the carrier element and hence the carrier element of the seat bench may be lowered. To the contrary, in order to move the leg from its folded position into its unfolded position, after unlocking the second locking mechanism, a pulling force may be applied to the carrier element in order to straighten the leg relative to the carrier element and hence to rise the carrier element of the seat bench.

The third locking mechanism may comprise a third latching element which is connected to the carrier element and which, when being arranged in a latching position, is adapted to latch with a complementary third holding element provided on the armrest in order to lock the armrest in both its deployed position and its stowed position. Preferably, the third latching element is biased into its latching position.

The first locking mechanism may comprise a rotatable actuator handle. In the locking state of the first locking mechanism, the rotatable actuator handle may be adapted to act on a first locking element in order to maintain the first locking element in engagement with the first latching element and to thus lock the first latching element in a position in which the first latching element latches with the complementary first holding element. Upon unlocking the first locking mechanism, the rotatable actuator handle may be adapted to move the first locking element from an unlocking position in which it locks the first latching element into an unlocking position in which it is disengaged from the first latching element and thus releases the first latching element.

By the first locking element, the first latching element thus may be secured in its latching position in which it engages with the first holding element so as to hold the backrest in either its deployed or its stowed position. The first locking element may be substantially pin-shaped and may be connected to the rotatable actuator handle via a spherical nut. Thus, a rotation of the actuator handle may cause a corresponding translatory movement of the first locking element and hence disengagement of the first locking element from the first latching element. When the first locking element is arranged in its locking position, an end portion of the first locking element may extend into a bore provided in the first latching element, whereas, when the first locking element is arranged in its unlocking position, the end portion of the first locking element may be retracted from the bore provided in the first latching element. Preferably, the first locking element is biased into its locking position by a spring, in particular a spiral spring which may surround the pin-shaped first locking element and which may act on an abutting element radially extending from an outer circumference of the pin-shaped first locking element.

In an embodiment of the seat bench which is equipped with a plurality of seats and hence a plurality of backrests, the first locking mechanism preferably comprises a plurality of first locking elements and a plurality of first latching elements. Each first locking element may interact with an associated first latching element and each pair of a first locking element and a respective first latching element may be associated with one of the plurality of backrests of the plurality of seats. Preferably, the first locking elements are coupled to each other by a respective coupling element in such a manner that all first locking elements are movable between their locking position and their unlocking position simultaneously.

The coupling element may comprise a bowden cable extending between subsequent first locking elements of the first locking mechanism. In particular, the coupling element comprises a plurality of bowden cables connecting all first locking elements of the first locking mechanism to each other in such a manner that, upon actuation of the rotatable actuator handle, a translatory movement of the first locking element that is immediately connected to the rotatable actuator handle is transferred to the subsequent first locking elements in order to move all first locking elements from their locking position into their unlocking position.

The leg of the carrier arrangement may comprise a first portion which is pivotably connected to the carrier element and a second portion which is pivotably connected to the first portion. In the locking state of the second locking mechanism, the first portion of the leg may be locked in its position due to the interaction of the second latching element with the second holding element. Furthermore, the second locking mechanism may comprise a further second latching element which is connected to the first portion of the leg. The further second latching element may have a similar design as the second latching element, i.e. the further second latching element may also be pin-shaped and biased into its latching position by a further spring element which may be designed in the form of a spiral spring which surrounds the pin-shaped further second latching element and which acts on a projection radially extending from an outer circumference of the pin-shaped further second latching element.

When being arranged in its latching position, the further second latching element is adapted to latch with a complementary further second holding element provided on the second portion of the leg in order to lock the second portion of the leg in both its unfolded position and its folded position relative to the first portion of the leg. Similar to the second holding element, the further second holding element may comprise an opening which is adapted to receive the pin-shaped further second latching element in order prevent a movement of the second portion of the leg relative to the first portion of the leg. To the contrary, when the further second latching element is not engaged with the opening of the further second holding element, the second portion of the leg is free to pivot relative to the first portion of the leg. In a preferred embodiment of the foldable seat bench, in order to fold the leg, the first portion of the leg is pivoted relative to the carrier element in a first direction, whereas the second portion of the leg is pivoted relative to the first portion of the leg in a second direction opposite to the first direction.

The second locking mechanism may comprise an actuator handle which is connected to the second latching element via a first connecting element in such a manner that, upon actuation of the actuator handle, the second latching element is unlatched from the second holding element so as to unlock the leg and to thus allow a movement of the leg relative to the carrier element between its unfolded position and its folded position. The actuator handle may be arranged in the region of a side face of the carrier element which faces an aisle of a cabin of a passenger vehicle, when the foldable seat bench is installed in that's passenger vehicle cabin. The first connecting element may comprise a bowden cable extending between the actuator handle and the second latching element so that a pulling force applied to the actuator handle may be transferred to the second latching element via the first connecting element in order to disengage the second latching element from the second holding element.

The actuator handle of the second locking mechanism preferably is connected to the further second latching element via a second connecting element in such a manner that, upon actuation of the actuator handle, the further second latching element is unlatched from the further second holding element so as to unlock the second portion of the leg and to thus allow a movement of the second portion of the leg between its unfolded position and its folded position relative to the first portion of the leg. The second connecting element may also comprise a bowden cable extending between the actuator handle and the further second latching element so that a pulling force applied to the actuator handle may be transferred to the further second latching element via the second connecting element in order to disengage the further second latching element from the further second holding element.

In a preferred embodiment of the foldable seat bench which comprises a plurality of seats and hence plurality of legs, the second locking mechanism comprises a plurality of second latching elements and a plurality of second holding elements. Each second latching element may interact with an associated second holding element and each pair of a second latching element and a respective associated second holding element may be associated with one of the plurality of legs of the plurality of seats. Preferably, all second latching elements are connected to the actuator handle via a respective first connecting element in such a manner that all second latching elements are movable between a latching position in which they lock their associated leg and an unlatching position in which they release their associated leg simultaneously. As a result, all second latching elements of the second locking mechanism can be operated by simply activating the actuator handle of the second locking mechanism. Hence, a particularly easy handling of the foldable seat bench is made possible.

When the foldable seat bench comprises a plurality of seats and hence plurality of legs, the second locking mechanism preferably further comprises a plurality of further second latching elements and a plurality of further second holding elements. Each further second latching element may interact with an associated further second holding element and each pair of a further second latching element and a respective associated further second holding element may be associated with one of the second portions of the plurality of legs of the plurality of seats. Preferably, all further second latching elements are connected to the actuator handle via a respective second connecting element in such a manner that all further second latching elements are movable between a latching position in which they lock their associated second portion of the leg and an unlatching position in which they release their associated second portion of the leg simultaneously.

The third locking mechanism may comprise an actuator button which is connected to or formed integral with the third latching element such that, upon actuation of the actuator button, the third latching element is unlatched from the third holding element so as to unlock the armrest and to thus allow a movement of the armrest relative to the carrier element between its deployed position and its stowed position. The third latching element may also be connected to or formed integral with the shaft which is connected to the carrier element. The third latching element may have an outer contour which matches with an inner contour of a recess of the third holding element such that the third latching element, in the locking state of the third locking mechanism, is received within the recess. Upon unlocking the third locking mechanism, the third latching elements may be moved out of the recess into an interior space of the third holding element which has an inner contour that allows a movement of the third holding element and hence the armrest relative to the third latching element.

In a preferred embodiment of the foldable seat bench, the carrier arrangement may comprise a further leg which is pivotably connected to the carrier element. For example, the further leg may constitute a front leg of the carrier arrangement. The further leg may be connected to the leg, which may constitute a rear leg of the carrier arrangement, via a tensioning element, in particular a flexible tensioning element. Upon moving the leg from its unfolded position into its folded position relative to the carrier element, the tensioning element may be loosened, thus allowing a pivotal movement of the further leg relative to the carrier element. The tensioning element may be attached to the further leg in the region of a leg end facing the carrier element. Furthermore, the tensioning element may be attached to the leg in the region of a leg foot.

BRIEF DESCRIPTION OF THE DRAWINGS

Preferred embodiments of the disclosure herein will now be described in greater detail with reference to the appended drawings, wherein.

DETAILED DESCRIPTION

Figure 1:
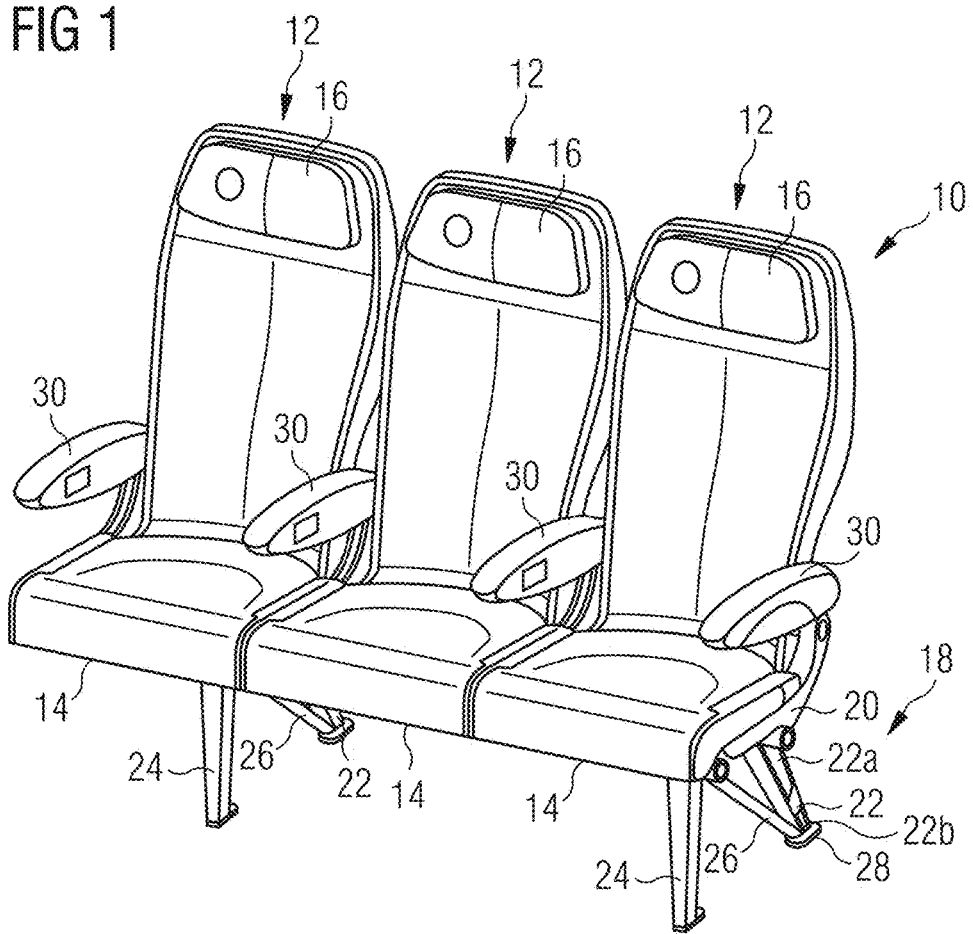
FIG. 1 shows a foldable seat bench which may be installed in a passenger vehicle cabin in an unfolded state.

In the embodiment shown in the drawings, a foldable seat bench 10 which is suitable for installation in a passenger vehicle cabin comprises three seats 12. It is, however, also conceivable to provide the seat bench 10 with only two seats 12 or only one seat 12. Furthermore, the seat bench 10 may comprise more than three seats 12. Each seat 12 comprises a seat area 14 and a backrest 16. A carrier arrangement 18 of the seat bench 10 comprises a rigid carrier element 20 which is designed in the form of a seat pan and which carries the seats 12, i.e. the seat areas 14 of the seats 12.

Furthermore, the carrier arrangement 18 comprises two rear legs 22 and two front legs 24. Each rear leg 22 comprises a first portion 22a which is pivotably connected to carrier element 20 and a second portion 22b which is pivotably connected to the first portion 22a. To the contrary, each front leg 24 is formed in one piece and pivotably connected to carrier element 20. Furthermore, each front leg 24 is connected to a rear leg 22 arranged opposed thereto via a flexible tensioning element 26. A first end of the tensioning element 26 is attached to the front leg 24 in the region of a leg end facing the carrier element 20. A second end of the tensioning element 26 is attached to the rear leg 22 in the region of a leg foot 28.

The seat bench 10 also is provided with four armrests 30, wherein two armrests 30 are arranged in the region of outer side faces of the seat bench 10, and wherein two further armrests 30 extend between adjacent seats 12 in order to provide each seat 12 with two armrests 30.

Figure 2:
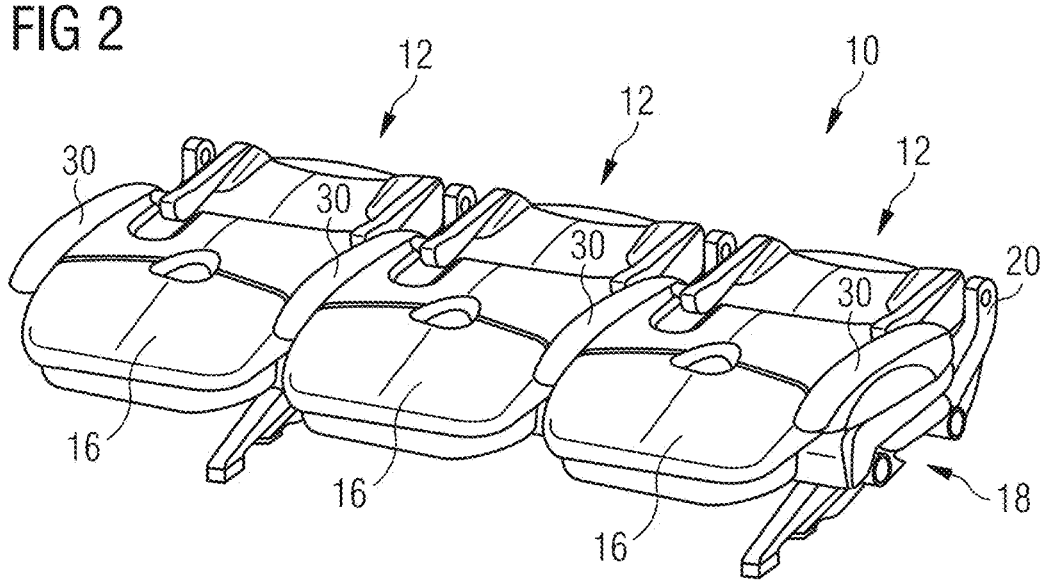
FIG. 2 shows the foldable seat bench according to FIG. 1 in a folded state.

As becomes apparent from a comparison of FIGS. 1 and 2, the seat bench 10 may be transferred between an unfolded state depicted in FIG. 1 and a folded state shown in FIG. 2. When the seat bench 10 is in its unfolded state, the backrests 16 of the seats 12 are arranged in a deployed position in which they extend at an angle of approximately 70° to 110°, i.e. substantially perpendicular relative to the seat areas 14 of the seats 12. To the contrary, when the seat bench 10 is in its folded state, the backrests 16 are arranged in a stowed position, in which they extend at an angle of approximately 0° to 20°, i.e. substantially parallel relative to the seat areas 14.

Furthermore, when the seat bench 10 is in its unfolded state, the rear legs 22 and the front legs 24 are arranged an unfolded position. To the contrary, when the seat bench 10 is in its folded state, the rear legs 22 assume a folded position while the front legs 24 assume a pivoted position relative to the carrier element 20. Finally, in the unfolded state of the seat bench 10, the armrests 30 are arranged at a first distance from the carrier element 20. When, however, the seat bench 10 is in its folded position, the armrests 30 are arranged at a second distance from the carrier element 20 which is smaller than the first distance.

In the folded state of the seat bench 10, when the backrests 16 and the armrests 30 of the seats 12 are arranged in their stowed position, the rear legs 22 assume their folded position relative to the carrier element 20 and the front legs 24 assume there pivoted position relative to the carrier element 20, the seat bench 10 is no longer usable for seating. However, the dimensions of the seat bench 10 are significantly reduced, in particular in a direction perpendicular to a floor of a vehicle passenger cabin accommodating the seat bench 10. Accordingly, the folding of the seat bench 10 clears a considerable amount of space within the passenger vehicle cabin which may be used to hold other goods, such as for example cargo goods instead. Furthermore, when the backrests 16 are arranged in their stowed position as shown in FIG. 2, a backside of the backrests 16 may be used as a support for a stretcher. Thus, by folding the seat bench 10, space for the transportation of a disabled person may be provided.

Figure 3:
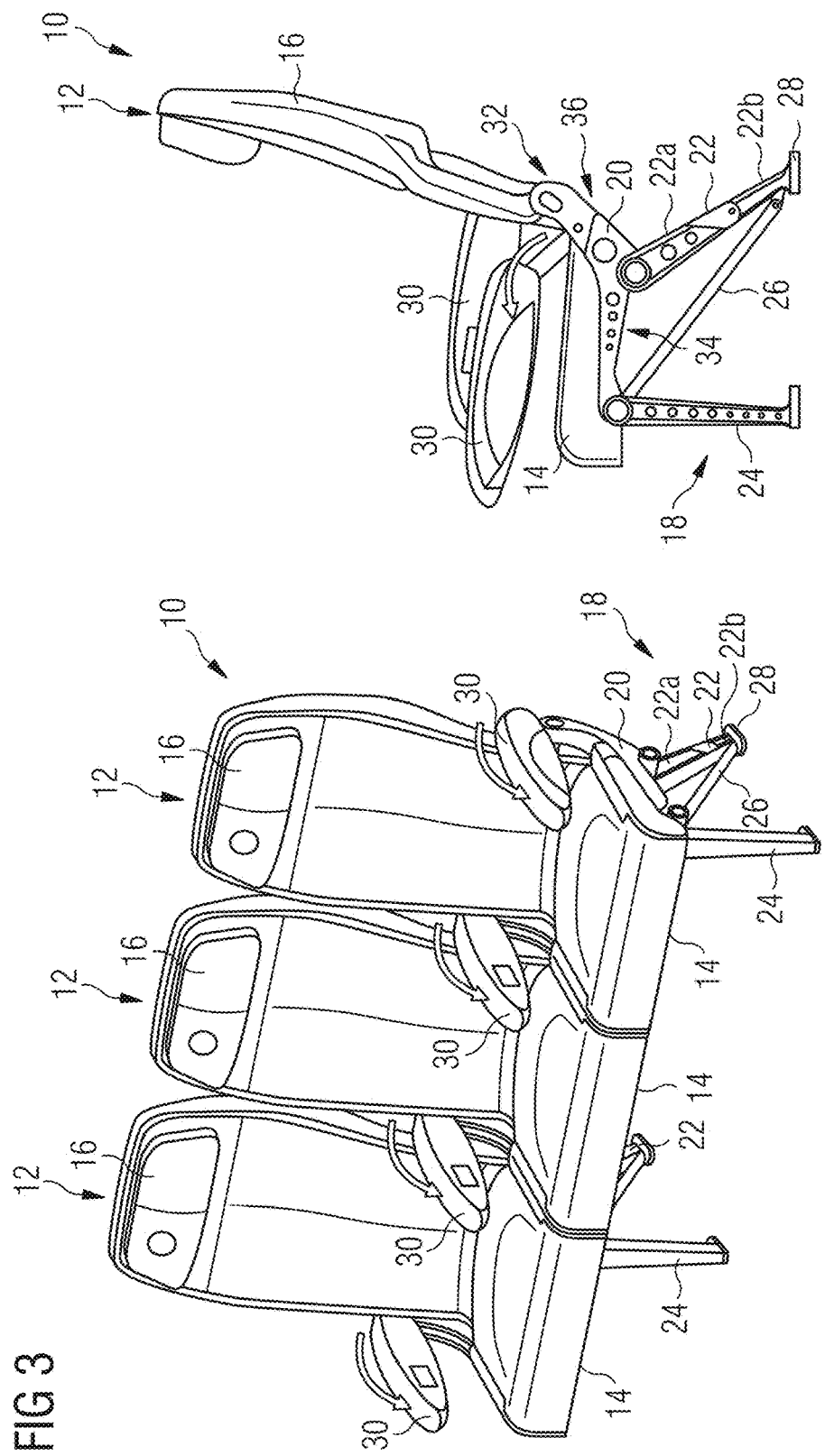
FIGS. 3 through 6 show the process of transferring the seat bench from the unfolded state according to FIG. 1 into the folded stage according to FIG. 2.

The process of transferring the seat bench 10 from the unfolded state according to FIG. 1 into the folded stage according to FIG. 2 is depicted in greater detail in FIGS. 3 through 6. As shown in FIG. 3, in a first step, the armrests 30 are moved from their deployed position into their stowed position by manually pushing the armrests 30 downwards relative to the carrier element 20 in the direction of the seat areas 14 of the seats 12. In the embodiment of a seat bench 10 shown in the drawings, the armrests 30 are movable between their deployed position and their stowed position independently from each other. Thus, upon transferring the seat bench 10 between its unfolded state and its folded state, the armrests 30 have to be moved between their deployed position and their stowed position one by one. It is, however, also conceivable to equip the seat bench 10 with armrests 30 that are coupled to each other so as to be movable relative to the carrier element 20 between their deployed position and their stowed position simultaneously.

Figure 4:
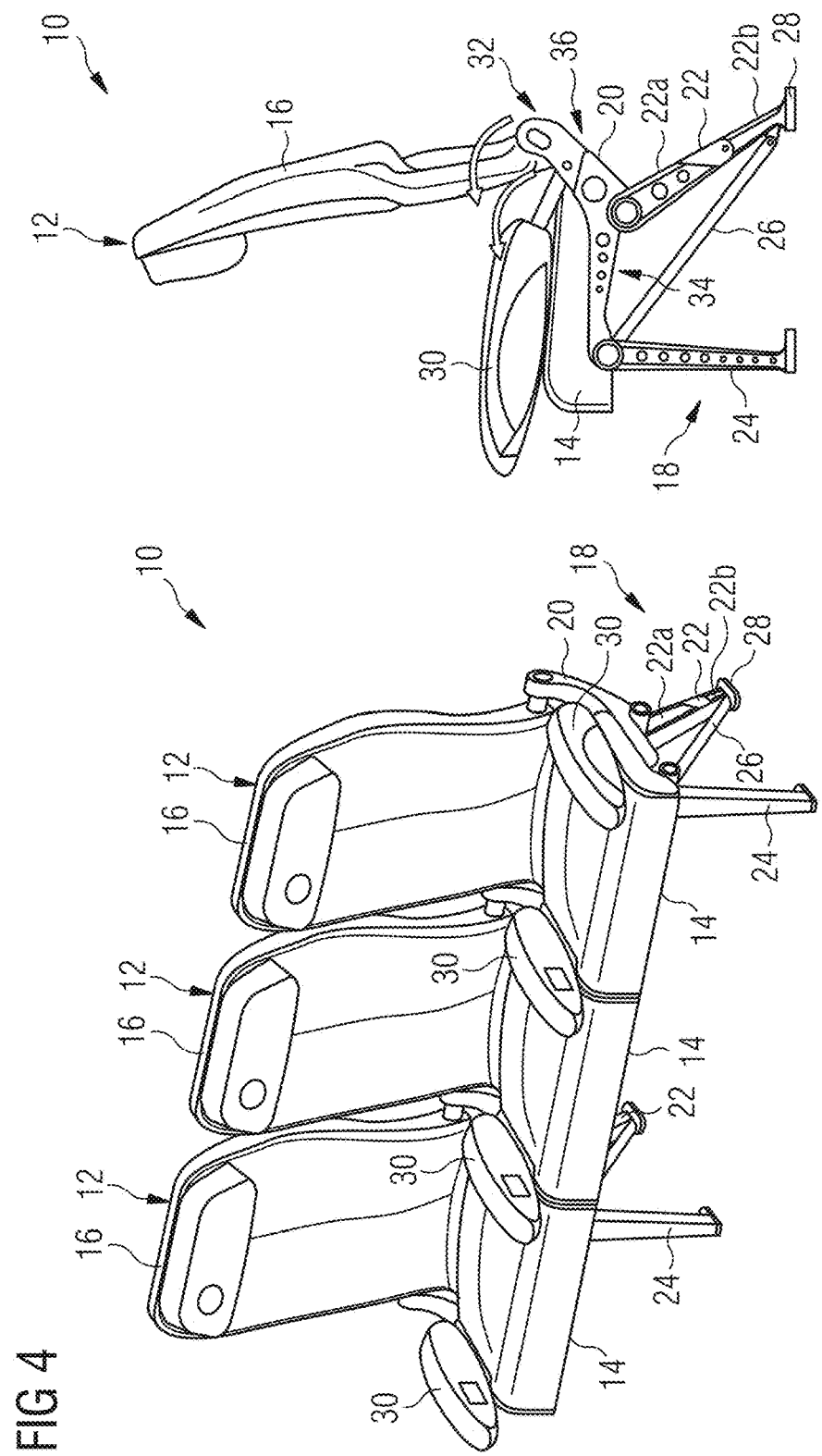
Figure 5:
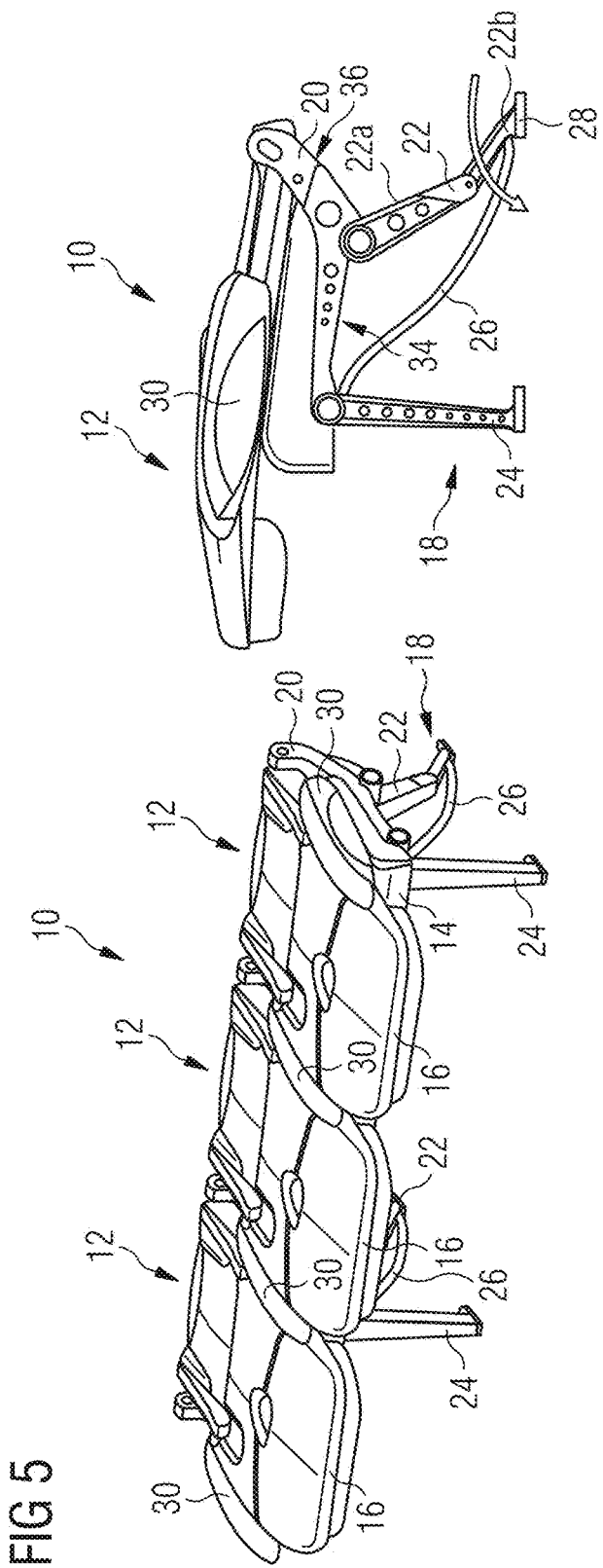

After stowing the armrests 13, the backrests 16 are moved relative to the carrier element 20 from their deployed position in which they extend substantially perpendicular to the seat areas 14 into their stowed position in which they extend substantially parallel to the seat areas 14, see FIG. 4. In the embodiment of a seat bench 10 shown in the drawings, the backrests 16 are coupled to each other so as to be movable relative to the carrier element 20 between the deployed position and their stowed position simultaneously. Thus, only a single handling step is necessary to move all backrests 16 of the seat bench 10 between their deployed position and their stowed position by manually pivoting the backrests 16 in the direction of the seat areas 14 of the seats 12. As a result, the folding/unfolding process can be accomplished particularly easily and quickly. It is, however, also conceivable to equip the seat bench 10 with backrests 16 that are movable relative to the carrier element 20 between their deployed position and their stowed position independently from each other. Then one or more backrests 16 may be stowed while other backrests 16 may be maintained in the deployed position. As a result, a part of the seat bench 10 may still be used for seating purposes, while the space which is freed by stowing individual backrests 16 may be used for storing goods or the like.

Figure 6:
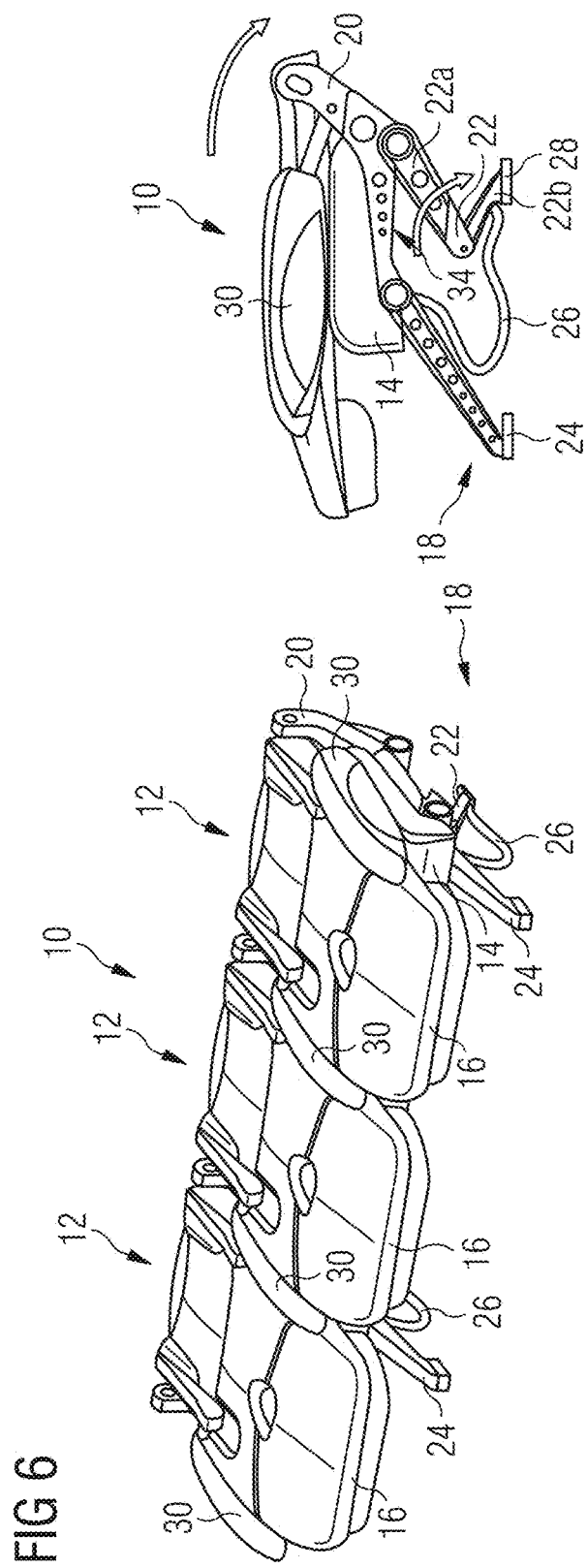

Finally, the rear legs 22 are moved from their unfolded position into their folded position. In particular, by applying a manual downwards directed pushing force onto a backside of the stowed backrests 16 and hence the carrier element 20, the second portion 22b of each rear leg 22 first is pivoted in a first direction relative to the first portion 22a of the rear leg 22, see FIG. 5. In the arrangement depicted in FIG. 5, the second portion 22b of each rear leg 22 is pivoted in a counter-clockwise direction relative to the first portion 22a of the rear leg 22. Thereby, the tensioning element 26 is loosened. As a result, the manual downwards directed pushing force which is applied onto the backside of the stowed backrests 16 causes a pivotal movement of the front legs 24 relative to the carrier element 20 in a second direction opposite to the first direction, see FIG. 6. In the arrangement of FIG. 6, the front legs 24 are pivoted in a clockwise direction relative to the carrier element 20. In addition, the first portion 22a of each rear leg 22 is pivoted relative to the carrier arrangement 20 in the second direction, i.e. in FIG. 6 in a clockwise direction.

The seat bench 10 further comprises a first locking mechanism 32 which, in a locking state, is adapted to lock the backrests 16 of the seats 12 in both their deployed position and their stowed position. A second locking mechanism 34, in a locking state, is adapted to lock the rear legs 22 of the carrier arrangement 18 in both their unfolded position and their folded position. Finally, a plurality of third locking mechanisms 36 is provided. Each third locking mechanism 36, in a locking state, is adapted to lock one of the armrests 30 in both deployed position and its stowed position. The seat bench 10 consequently may be folded and unfolded particularly quickly and easily and with a high operational reliability. Hence, when the foldable seat bench 10 is installed in an aircraft, the folding process may be performed by the cabin or ground crew without the involvement of additional maintenance personnel.

The first locking mechanism 32, the second locking mechanism 34 and/or the third locking mechanism 36 may be designed in the form of mechanical locking mechanism or electric locking mechanism, as desired. An embodiment of a first locking mechanism 32 which is designed in the form of a mechanical locking mechanism is depicted in greater detail in FIGS. 7 and 8. In particular, the first locking mechanism 32 comprises a first latching element 38 which is attached to the carrier element 20. When being arranged in a latching position, the first latching element 38 latches with a complementary first holding element 40 provided on one of the backrests 16 in order to lock the backrest 16 in both its deployed position and its stowed position.

The first latching element 38 comprises two opposing latching surfaces 42a, 42b each of which is adapted to interact with the complementary first holding element 40. The first holding element 40 is designed in the form of a bolt which extends from a side face of one of the backrests 16 and which, upon moving the backrest 16 between its deployed position and its stowed position, travels along a guiding recess 44 provided in the region of a side face of the seat 12 in the carrier element 20 in order to allow for the backrest 16, in its stowed position, being arranged in close contact with the seat area 14 of the seat 12.

The first latching element 38 is biased into its latching position by two spring elements 46. The spring elements 46 apply a biasing force onto the first latching element 38 which biases the first latching element 38 towards the guiding recess 44 into engagement with the first holding element 40.

When the backrest 16 is manually moved between its deployed position and its stowed position, the first holding element 40 travels along the guiding recess 44 formed in the carrier element 20. While traveling along the guiding recess 44, the first holding element 40 pushes the first latching element 38 in a direction away from the guiding recess 44 against the biasing force applied onto the first latching element 38 by the spring elements 46 and thereby disengages from a first latching surface 42a, 42b of the first latching element 38. However, as soon as the backrest 16 has reached its final either deployed or stowed position and hence the holding element 40 has reached its corresponding final position in the guiding recess 44, the first latching element 38, by the biasing force applied onto the first latching element 38 by the spring elements 46, again is moved towards the guiding recess 44 such that a second latching surface 42a, 42b of the first latching element 38 comes into engagement with the first holding element 40.

The first locking mechanism 32 further comprises a first actuator 48 which, upon actuation, is adapted to unlock the first locking mechanism 32 and which is arranged in the region of a side face of the foldable seat bench 10 which faces an aisle of the cabin of a passenger vehicle, when the foldable seat bench 10 is installed in the cabin of a passenger vehicle. Thus, the first locking mechanism 32 is easily accessible for a person, in particular a cabin or ground crew member standing in the aisle of the passenger vehicle cabin.

Figure 7:
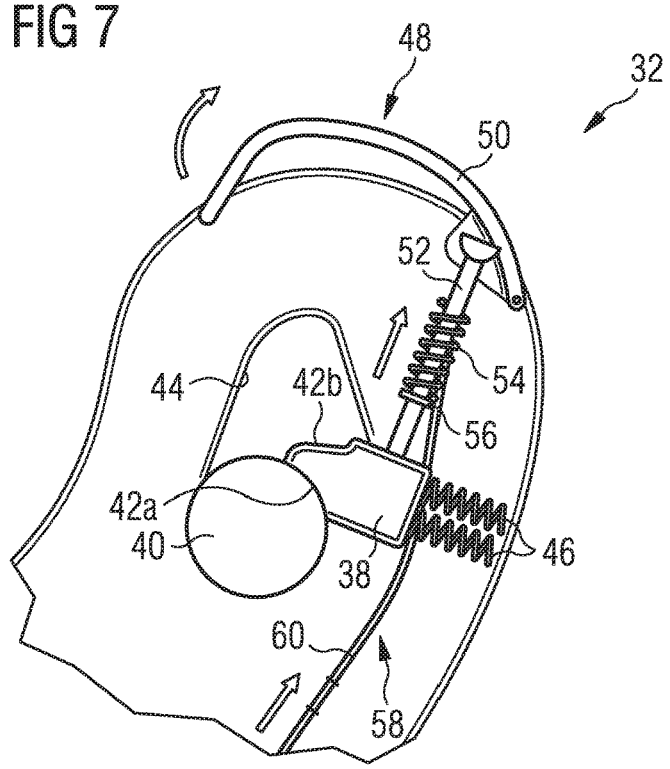
FIGS. 7 and 8 show a first locking mechanism for locking backrests of the seats of the seat bench in both its deployed position and its stowed position.
Figure 8:
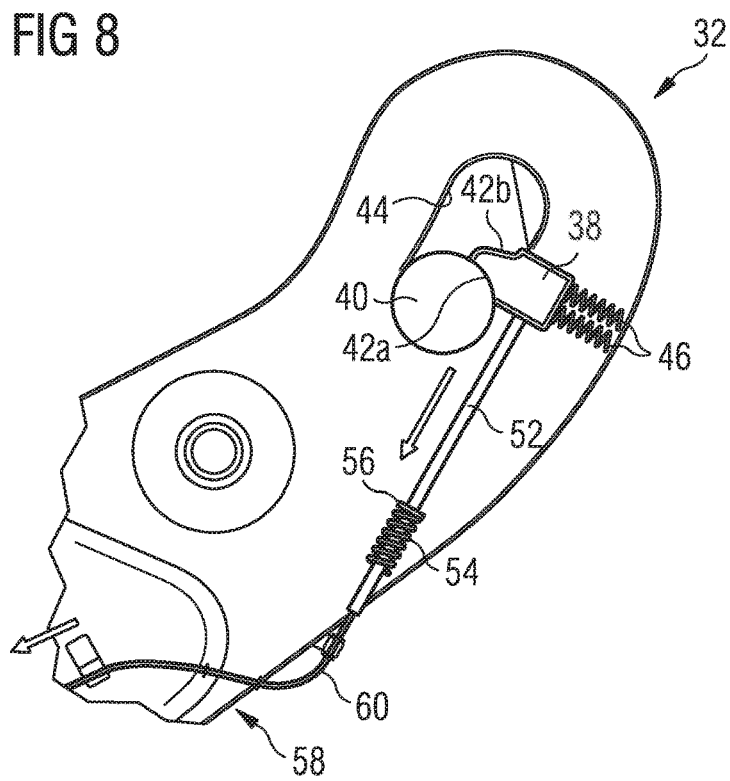
Figure 9:
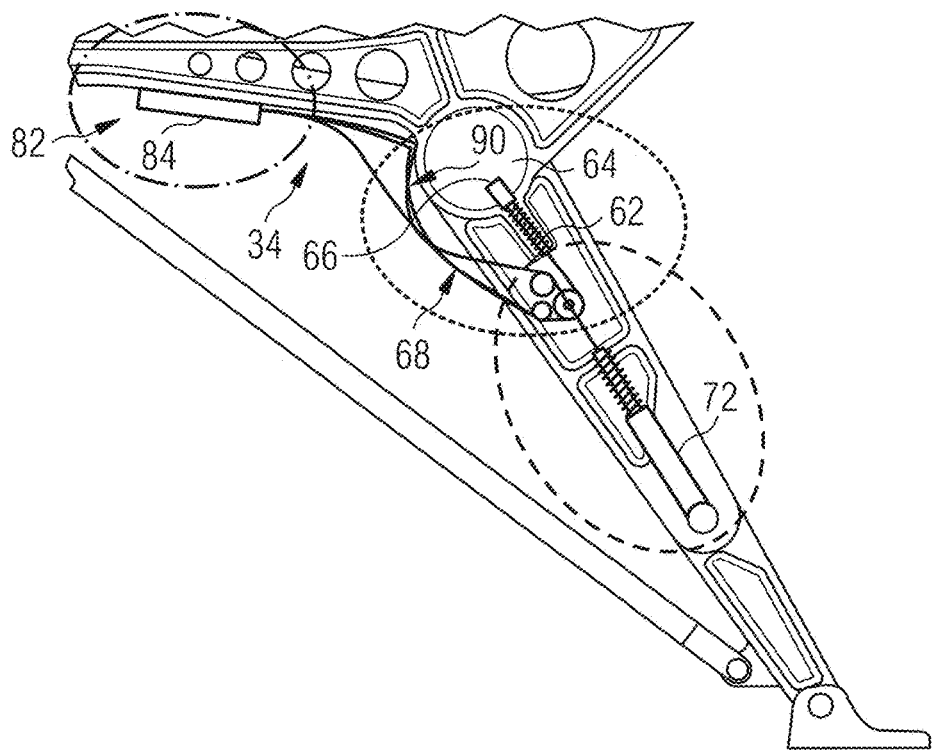
FIGS. 9 to 15 show a second locking mechanism for locking a leg of the carrier arrangement of the seat bench in both its unfolded position and its folded position.
Figure 10:
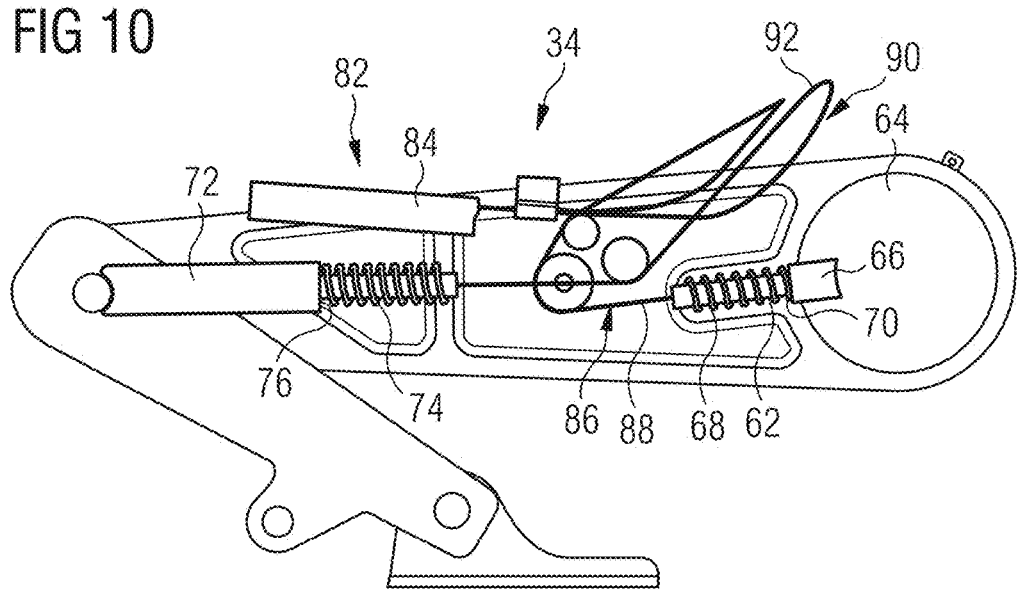
Figure 11:
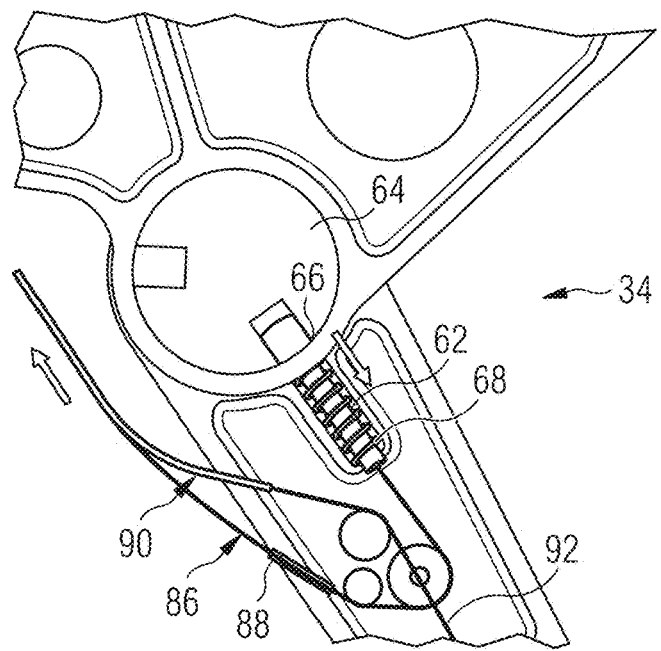
Figure 12:
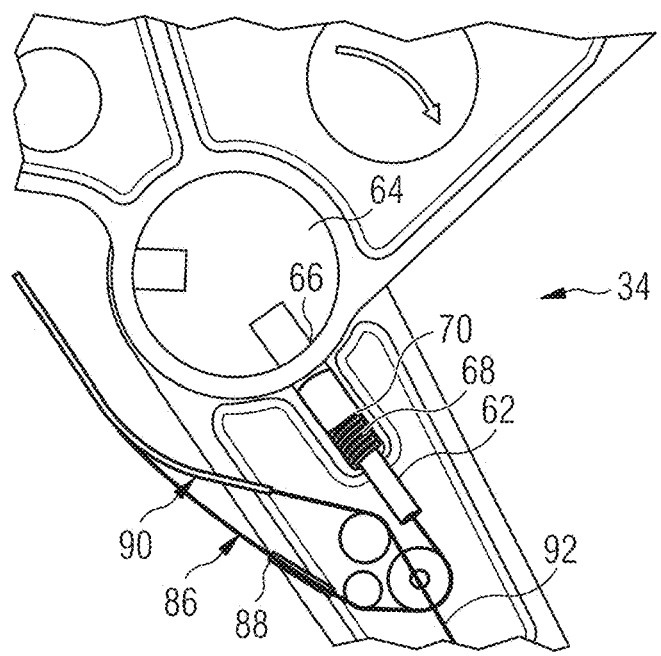
Figure 13:
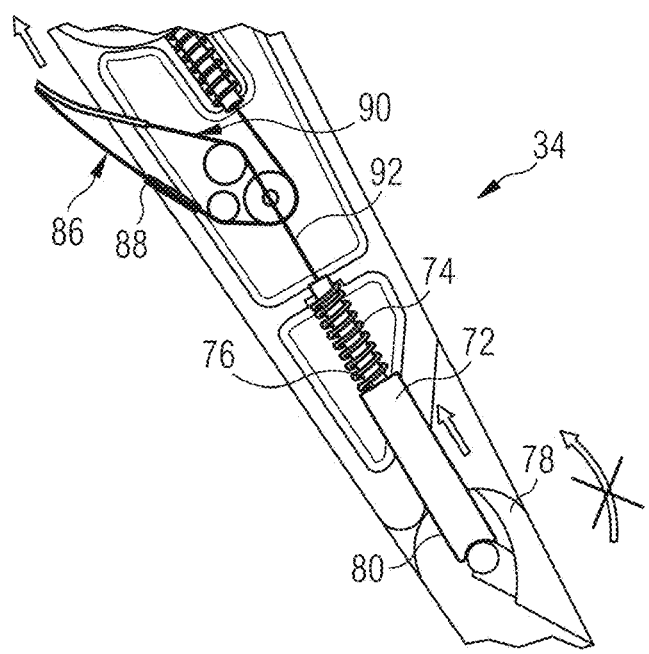
Figure 14:
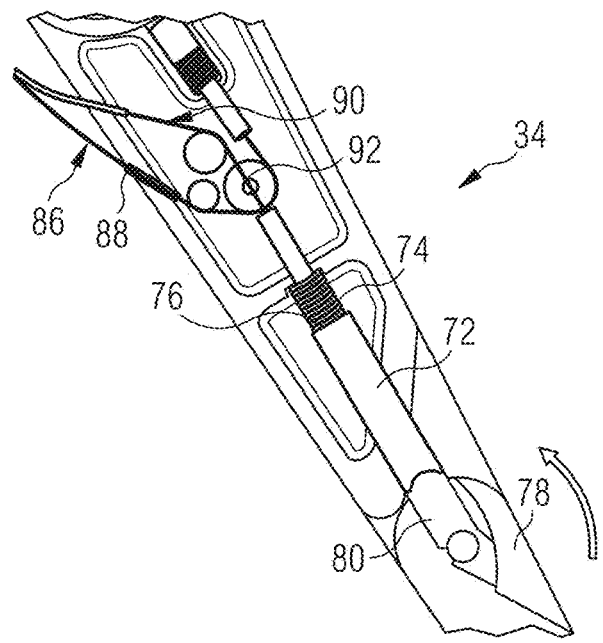
Figure 15:
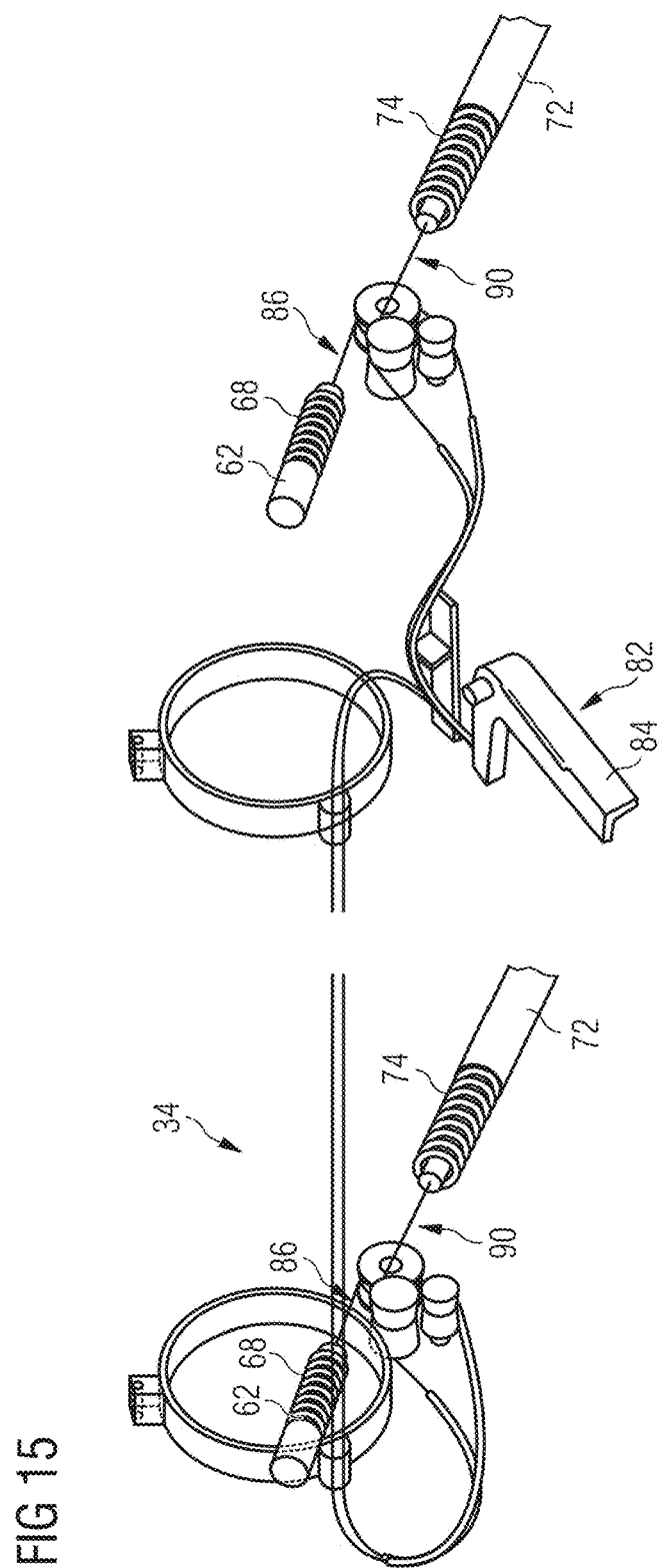

In the arrangement depicted in FIGS. 7 and 8, the first actuator 48 comprises a rotatable actuator handle 50. In the arrangement depicted in FIG. 7, the actuator handle 50 is rotated in a clockwise direction in order to unlock the first locking mechanism 32. In the locking state of the first locking mechanism 32, the rotatable actuator handle 50 acts on a first locking element 52 in order to maintain the first locking element 52 in engagement with the first latching element 38 and to thus lock the first latching element 38 in a position in which the first latching element 38 latches with the complementary first holding element 40. Upon unlocking the first locking mechanism 32, the rotatable actuator handle 50 moves the first locking element 52 from an unlocking position in which it locks the first latching element 38 into an unlocking position in which it is disengaged from the first latching element 38 and thus releases the first latching element 38. By the first locking element 52, the first latching element 38 thus is secured in its latching position in which it engages with the first holding element 40 so as to hold the backrest 16 in either its deployed or its stowed position.

In the embodiment of the first locking mechanism 32 shown in the drawings, the first locking element 52 is substantially pin-shaped and is connected to the rotatable actuator handle 50 via a spherical nut. Thus, a rotation of the actuator handle 50 causes a corresponding translatory movement of the first locking element 52 and hence disengagement of the first locking element 52 from the first latching element 38. When the first locking element 52 is arranged in its locking position, an end portion of the first locking element 52 extends into a bore provided in the first latching element 38, whereas, when the first locking element 52 is arranged in its unlocking position, the end portion of the first locking element 52 is retracted from the bore provided in the first latching element 38. The first locking element 52 is biased into its locking position by a spiral spring 54 which surrounds the pin-shaped first locking element 52 and which acts on an abutting element 56 radially extending from an outer circumference of the pin-shaped first locking element 52.

While FIG. 7 shows a part of the first locking mechanism 32 which is associated with an outer seat 12 of the seat bench 10, FIG. 8 shows a part of the first locking mechanism 32 which is associated with an inner seat 12 of the seat bench 10. Thus, since the seat bench 10 is equipped with a plurality of seats 12 and hence a plurality of backrests 16, the first locking mechanism 32 comprises a plurality of first locking elements 52 and a plurality of first latching elements 38. Each first locking element 52 interacts with an associated first latching element 38 and each pair of a first locking element 52 and a respective first latching element 38 is associated with one of the plurality of backrests 16 of the plurality of seats 12. All first locking elements 52 of the first locking mechanism 32 are coupled to each other by a coupling element 58 in such a manner that all first locking elements 52 are movable between their locking position and their unlocking position simultaneously.

The coupling element 58 comprises a plurality of bowden cables 60 extending between subsequent first locking elements 52 of the first locking mechanism 32 and hence connecting all first locking elements 52 of the first locking mechanism 32 to each other in such a manner that, upon actuation of the rotatable actuator handle 50, a translatory movement of the first locking element 52 that is immediately connected to the rotatable actuator handle 50 (see FIG. 7) is transferred to the subsequent first locking elements 52 (see FIG. 8) in order to move all first locking elements 52 from their locking position into their unlocking position. Thus, upon actuation of the first actuator 48, i.e. upon actuation of the rotatable actuator handle 50, all backrests 16 of the plurality of seats 12 can be unlocked and thus can be moved between their deployed position and their stowed position.

An embodiment of a second locking mechanism 34 which is also designed in the form of a mechanical locking mechanism is depicted in greater detail in FIGS. 10 to 15. The second locking mechanism 34 comprises a second latching element 62 which is attached to one of the rear legs 22, i.e. to a first portion 22a of one of the rear legs 22, and which, when being arranged in a latching position, is adapted to latch with a complementary second holding element 64 provided on the carrier element 20 in order to lock the leg 22 in both its unfolded position and its folded position. In particular, the second latching element 62, when being engaged with the complementary second holding element 64 locks the first portion 22a of the rear leg 22 in its position relative to the carrier element 20.

The second latching element 62 of the second locking mechanism 34 is substantially pin-shaped and configured to latch with a complementary second holding element 64 which comprises an opening 66 for receiving the pin-shaped second latching element 62. When the second latching element 62 is received in the opening 66 of the second holding element 64, movement of the leg 22 relative to the carrier element 20 is prevented. To the contrary, when the second latching element 62 is not engaged with the opening 66 of the second holding element 64, the leg 22 is free to pivot relative to the carrier element 20.

The second latching element 62 is biased into its latching position. The biasing force, which is applied to the second latching element 62 by a spiral spring 68 surrounding the pin-shaped second latching element 62 and acting on a projection 70 radially extending from an outer circumference of the pin-shaped second latching element 62, biases the second latching element 62 towards the opening 66 provided in the second holding element 64 so as to bring the second latching element 62 into engagement with the second holding element 64.

Furthermore, the second locking mechanism 34 comprises a further second latching element 72 which is connected to the first portion 22a of the leg 22. The further second latching element 72 has a similar design as the second latching element 62, i.e. the further second latching element 72 is also be pin-shaped and biased into its latching position by a further spiral spring 74 which surrounds the pin-shaped further second latching element 72 and which acts on a projection 76 radially extending from an outer circumference of the pin-shaped further second latching element 72.

When being arranged in its latching position, the further second latching element 72 is adapted to latch with a complementary further second holding element 78 provided on the second portion 22b of the rear leg 22 in order to lock the second portion 22b of the leg 22 in both its unfolded position and its folded position relative to the first portion 22a of the leg 22. Similar to the second holding element 64, the further second holding element 78 comprises an opening 80 which is adapted to receive the pin-shaped further second latching element 72 in order prevent a movement of the second portion 22b of the leg 22 relative to the first portion 22b of the leg 22. To the contrary, when the further second latching element 72 is not engaged with the opening 80 of the further second holding element 78, the second portion 22b of the leg 22 is free to pivot relative to the first portion 22a of the leg 22.

Similar to the first locking mechanism 32, also the second locking mechanism 34 comprises a second actuator 82 which, upon actuation, is adapted to unlock the second locking mechanism 34 and which is arranged in the region of a side face of the foldable seat bench 10 which faces an aisle of the cabin of a passenger vehicle, when the foldable seat bench 10 is installed in the cabin of a passenger vehicle. Thus, also the second locking mechanism 34 is easily accessible for a person, in particular a cabin or ground crew member standing in the aisle of the passenger vehicle cabin.

The second actuator 82 of the second locking mechanism 34 comprises an actuator handle 84 which is arranged in the region of a side face of the carrier element 20 which faces an aisle of a cabin of a passenger vehicle, when the foldable seat bench 10 is installed in a passenger vehicle cabin. The actuator handle 84 is connected to the second latching element 62 via a first connecting element 86 in such a manner that, upon actuation of the actuator handle 84, the second latching element 62 is unlatched from the second holding element 64 so as to unlock leg 22, i.e. the first portion 22a of the leg 22 and to thus allow a movement of the leg 22, i.e. the first portion 22a of the leg 22 relative to the carrier element 20 between its unfolded position and its folded position. In particular, the first connecting element 86 comprises a bowden cable 88 extending between the actuator handle 84 and the second latching element 62 so that a pulling force applied to the actuator handle 84 is transferred to the second latching element 62 via the first connecting element 84 in order to disengage the second latching element from the second holding element, see FIGS. 11 and 12.

The actuator handle 84 of the second locking mechanism 34 also is connected to the further second latching element 72 via a second connecting element 90 in such a manner that, upon actuation of the actuator handle 84, the is further second latching element 72 is unlatched from the further second holding element 78 so as to unlock the second portion 22b of the leg 22 and to thus allow a movement of the second portion 22b of the leg 22 between its unfolded position and its folded position relative to the first portion 22a of the leg 22. The second connecting element 90 comprises a bowden cable 92 extending between the actuator handle 84 and the further second latching element 72 so that a pulling force applied to the actuator handle 84 is transferred to the further second latching element 72 via the second connecting element 90 in order to disengage the further second latching element 72 from the further second holding element 78.

Since the foldable seat bench 10 shown in the drawings comprises a plurality of rear legs 22, the second locking mechanism 34 comprises a plurality of second latching elements extend to and a plurality of second holding elements 64. Each second latching element 62 interacts with an associated second holding element 64 and each pair of a second latching element 62 and a respective associated second holding element 64 is associated with one of the plurality of rear legs 22. All second latching elements are connected to the actuator handle 84 via a respective first connecting element 86 in such a manner that all second latching elements 62 are movable between a latching position in which they lock their associated leg 22, i.e. their associated first leg portion 22a, and an unlatching position in which they release their associated leg 22, i.e. their associated first leg portion 22a, simultaneously.

In addition, the second locking mechanism 34 comprises a plurality of further second latching elements 72 and a plurality of further second holding elements 78. Each further second latching element 72 interacts with an associated further second holding element 78 and each pair of a further second latching element 72 and a respective associated further second holding element 78 is associated with one of the second portions 22b of the plurality of legs 22. All further second latching elements 72 are connected to the actuator handle 84 via a respective second connecting element 90 in such a manner that all further second latching elements 72 are movable between a latching position in which they lock their associated second portion 22b of the leg 22 and an unlatching position in which they release their associated second portion 22b of the leg 22 simultaneously. As a result, upon actuation of the second actuator 82, i.e. upon actuation of the actuator handle 84, all second latching elements 62 and all further second latching element 72 of the second locking mechanism 34 are unlatched and hence all legs 22 of the seat bench are unlocked. As a result, all legs 22 can be moved between their folded position and their unfolded position.

Figure 16:
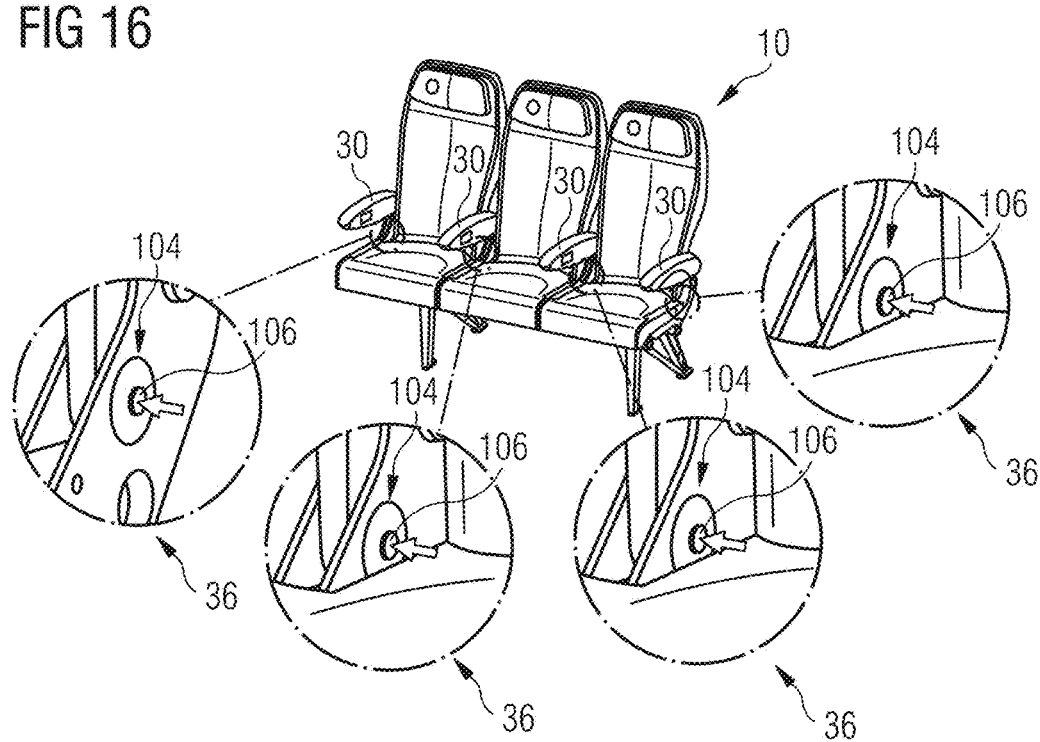
FIGS. 16 and 17 show a third locking mechanism for locking an armrest of a seat of the seat bench in both its deployed position and its stowed position.
Figure 17:
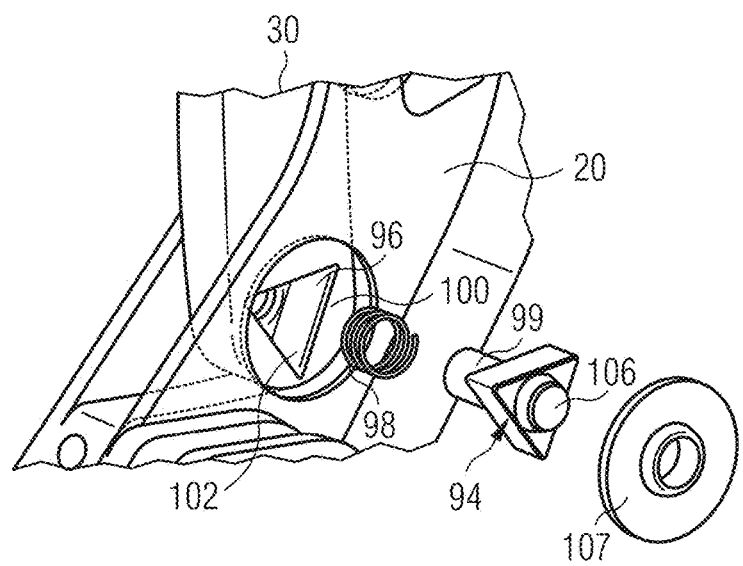

Finally, an embodiment of a third locking mechanism 36 which is also designed in the form of a mechanical locking mechanism is depicted in greater detail in FIGS. 16 and 17. The third locking mechanism 36 comprises a third latching element 94 which is connected to the carrier element 20 and which, when being arranged in a latching position, is adapted to latch with a complementary third holding element 96 provided on the armrest 30 in order to lock the armrest 30 in both its deployed position and its stowed position. In the embodiment of a third locking mechanism 36 depicted in FIG. 16, the third latching element 94 has the triangular-shaped outer contour and is biased into its latching position by a spring element 98. Furthermore, the third latching element 94 is attached to the carrier element 20 via a shaft 99 that is formed integral with the third latching element 94. The third holding element 96 comprises a recess 100 which has an inner contour that matches with the outer contour of the third latching element 94. Furthermore, the third holding element 96 has an interior space 102 with an inner contour that allows a movement of the third holding element 96 and hence the armrest 30 relative to the third latching element 94.

The third locking mechanism 36 comprises a third actuator 104 with an actuator button 106. The actuator button 106 of each third locking mechanism 36 faces an aisle of the cabin of a passenger vehicle, when the foldable seat bench 10 is installed in the cabin of a passenger vehicle and hence is easily accessible for a person standing in the aisle. A cover 107 surrounds the actuator button 106. The actuator button 106 is formed integral with the third latching element 94 such that, upon actuation of the actuator button 106, the third latching element 94, against the biasing force applied to the third latching element 94 by the spring element 98, is moved out of the recess 100 into the interior space 102 of the third holding element 96 and hence is unlatched from the third holding element 96. As a result, the armrest 30 is unlocked and free to be moved relative to the carrier element 20 between its deployed position and its stowed position.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft foldable seat bench comprising:
a seat comprising a seat area and a backrest;

a carrier arrangement comprising:
  a carrier element carrying the seat;
  a front leg formed in one piece and pivotably connected to the carrier element at a first end and is pivotably mounted on an aircraft floor at an opposite end; and
  a foldable rear leg comprising a first leg portion that is pivotably connected to the carrier element at a first end of the first leg portion, and a second leg portion that is pivotably connected at a first end of the second leg portion to a second end of the first leg portion, wherein the rear leg is pivotably mounted on the aircraft floor by a second end of the second leg portion;
a first locking mechanism which, in a locking state, is adapted to lock the backrest of the seat in both a deployed position and a stowed position of the backrest; and
a second locking mechanism which, in a locking state, is adapted to lock the rear leg of the carrier arrangement in both an unfolded position and a folded position,
wherein the backrest is movable relative to the carrier element between the deployed position in which the backrest extends at an angle of approximately 70° to 110° relative to the seat area and the stowed position in which the backrest extends at an angle of approximately 0° to 20° relative to the seat area,
wherein the rear leg is moved from the unfolded position to the folded position by pivoting the second leg portion and the front leg in opposite directions, and
wherein the carrier element is at a first distance from the aircraft floor in the unfolded position, and the carrier element is at a second distance from the aircraft floor in the folded position, the second distance from the aircraft floor being smaller than the first distance from the aircraft floor.

2. The aircraft foldable seat bench according to claim 1, wherein the seat further comprises:
  an armrest which is movable relative to the carrier element between a deployed position, in which the armrest is arranged at a first distance from the carrier element, and a stowed position, in which the armrest is arranged at a second distance from the carrier element, wherein the second distance from the carrier element is smaller than the first distance from the carrier element; and
  a third locking mechanism which, in a locking state, is adapted to lock the armrest in both the deployed position and the stowed position of the armrest.

3. The aircraft foldable seat bench according to claim 2, wherein:
  the first locking mechanism comprises a first actuator which, upon actuation, is adapted to unlock the first locking mechanism and which is arranged in a region of a face of the foldable seat bench which faces an aisle of an aircraft cabin, when the foldable seat bench is installed in the cabin;
  the second locking mechanism comprises a second actuator which, upon actuation, is adapted to unlock the second locking mechanism and which is arranged in a region of a face of the foldable seat bench which faces an aisle of an aircraft cabin, when the foldable seat bench is installed in the cabin; and
  the third locking mechanism comprises a third actuator which, upon actuation, is adapted to unlock the third locking mechanism and which is arranged in a region of a face of the foldable seat bench which faces an aisle of an aircraft cabin, when the foldable seat bench is installed in the cabin.

4. The aircraft foldable seat bench according to claim 2, wherein:
  the first locking mechanism is designed in a form of a mechanical locking mechanism or an electric locking mechanism;
  the second locking mechanism is designed in a form of a mechanical locking mechanism or an electric locking mechanism; and
  the third locking mechanism is designed in a form of a mechanical locking mechanism or an electric locking mechanism.

5. The aircraft foldable seat bench according to claim 2, wherein:
  the first locking mechanism comprises a first latching element which is attached to the carrier element and which, when being arranged in a latching position, is adapted to latch with a complementary first holding element provided on the backrest in order to lock the backrest in both the deployed position and the stowed position of the backrest, the first latching element being biased into the latching position of the first locking mechanism;
  the second locking mechanism comprises a second latching element which is attached to the rear leg and which, when being arranged in a latching position, is adapted to latch with a complementary second holding element provided on the carrier element in order to lock the rear leg in both the unfolded position and the folded position, the second latching element being biased into the latching position of the second locking mechanism; and
  the third locking mechanism comprises a third latching element which is connected to the carrier element and which, when being arranged in a latching position, is adapted to latch with a complementary third holding element provided on the armrest in order to lock the armrest in both the deployed position and the stowed position of the armrest, the third latching element being biased into the latching position of the third locking mechanism.

6. The aircraft foldable seat bench according to claim 5, wherein the first locking mechanism comprises a rotatable actuator handle:
  which, in the locking state of the first locking mechanism, is adapted to act on a first locking element in order to maintain the first locking element in engagement with the first latching element and to thus lock the first latching element in a position in which the first latching element latches with the complementary first holding element; and
  which, in an unlocking state of the first locking mechanism, is adapted to move the first locking element from a locking position in which the first locking element locks the first latching element into an unlocking position in which the first locking element is disengaged from the first latching element and thus releases the first latching element.

7. The aircraft foldable seat bench according to claim 5, wherein, in the locking state of the second locking mechanism, the first leg portion is locked in position relative to the carrier element due to the interaction of the second latching element with the second holding element, and wherein the second locking mechanism comprises a further second latching element which is connected to the first leg portion and which, when being arranged in a latching position, is adapted to latch with a complementary further second holding element provided on the second leg portion in order to lock the second leg portion in both the unfolded position and the folded position relative to the first leg portion, the further second latching element being biased into the latching position of the further second latching element.

8. The aircraft foldable seat bench according to claim 5, wherein the second locking mechanism comprises an actuator handle which is connected to the second latching element via a first connecting element such that, upon actuation of the actuator handle, the second latching element is unlatched from the second holding element so as to unlock the rear leg and to thus allow a movement of the rear leg relative to the carrier element between the unfolded position and the folded position, and wherein the actuator handle of the second locking mechanism is connected to a further second latching element via a second connecting element such that, upon actuation of the actuator handle, the further second latching element is unlatched from the further second holding element so as to unlock the second leg portion and to thus allow a movement of the second leg portion between an unfolded position and a folded position of the second leg portion relative to the first leg portion.

9. The aircraft foldable seat bench according to claim 5, wherein the third locking mechanism comprises an actuator button which is connected to or formed integral with the third latching element such that, upon actuation of the actuator button, the third latching element is unlatched from the third holding element so as to unlock the armrest and to thus allow a movement of the armrest between the deployed position and the stowed position of the armrest, wherein the third latching element in particular has an outer contour which matches with an inner contour of a recess of the third holding element such that the third latching element, in the locking state of the third locking mechanism, is received within the recess, and wherein the third latching element, upon unlocking the third locking mechanism is moved out of the recess into an interior space of the third holding element which has an inner contour that allows a movement of the third holding element and hence the armrest relative to the third latching element.

10. The aircraft foldable seat bench according to claim 1, wherein the front leg is connected to the rear leg via a tensioning element, wherein the tensioning element is attached to the front leg in a region of the first end of the front leg and to the rear leg in a region of the second end of the second leg portion.

11. An aircraft foldable seat bench comprising:
a plurality of seats, wherein each seat of the plurality of seats comprises a seat area, a backrest, and an armrest;
a carrier arrangement comprising:
    a carrier element carrying the plurality of seats;
    a front leg formed in one piece and pivotably connected to the carrier element at a first end and is pivotably mounted on an aircraft floor at an opposite end; and
    a foldable rear leg comprising a first leg portion that is pivotably connected to the carrier element at a first end of the first leg portion, and a second leg portion that is pivotably connected at a first end of the second leg portion to a second end of the first leg portion, wherein the rear leg is pivotably mounted on the aircraft floor by a second end of the second leg portion;
a first locking mechanism which, in a locking state, is adapted to lock the backrest of at least one of the seats in both a deployed position of the respective backrest and a stowed position of the respective backrest;
a second locking mechanism which, in a locking state, is adapted to lock the rear leg of the carrier arrangement in both an unfolded position of the leg and a folded position, and
a third locking mechanism which, in a locking state, is adapted to lock the armrest of at least one of the seats in both a deployed position and a stowed position of the armrest,
wherein the backrest of each seat is movable relative to the carrier element between the deployed position in which the respective backrest extends at an angle of approximately 70° to 110° relative to the respective seat area and the stowed position in which the respective backrest extends at an angle of approximately 0° to 20° relative to the seat area,
wherein the rear leg is moved from the unfolded position to the folded position by pivoting the second leg portion and the front leg in opposite directions, and
wherein the carrier element is at a first distance from the aircraft floor in the unfolded position, and the carrier element is at a second distance from the aircraft floor in the folded position, the second distance from the aircraft floor being smaller than the first distance from the aircraft floor,
wherein the armrest of each seat is movable relative to the carrier element between the deployed position in which the respective armrest is arranged at a first distance from the carrier element and the stowed position in which the respective armrest is arranged at a second distance from the carrier element which is smaller than the first distance from the carrier element,
wherein the backrests of the plurality of seats are coupled to each other to be movable relative to the carrier element between the deployed position and the stowed position of the backrests simultaneously, and
wherein the armrests of the seats are coupled to each other so as to be movable relative to the carrier element between the deployed position and the stowed position of the armrests simultaneously.

12. The aircraft foldable seat bench according to claim 11:
wherein the first locking mechanism is designed such that, upon actuation of a first actuator of the first locking mechanism, all backrests of the plurality of seats are unlocked and thus movable between the deployed position and the stowed position of the backrests;
wherein the carrier arrangement comprises a plurality of rear legs and the second locking mechanism is designed such that, upon actuation of a second actuator of the second locking mechanism, all rear legs are unlocked and thus movable between the unfolded position and the folded position; and
wherein the third locking mechanism is designed such that, upon actuation of a third actuator of the third locking mechanism, all armrests of the plurality of seats are unlocked and thus movable between the deployed position and the stowed position of the armrests.

13. The aircraft foldable seat bench according to claim 11, wherein:
the first locking mechanism comprises a first latching element which is attached to the carrier element and which, when being arranged in a latching position, is adapted to latch with a complementary first holding element provided on a backrest of at least one of the plurality of seats in order to lock the backrest in both the deployed position and the stowed position of the backrest, the first latching element being biased into the latching position of the first locking mechanism;

the second locking mechanism comprises a second latching element which is attached to the rear leg and which, when being arranged in a latching position, is adapted to latch with a complementary second holding element provided on the carrier element in order to lock the rear leg in both the unfolded position and the folded position, the second latching element being biased into the latching position of the second locking mechanism;

the third locking mechanism comprises a third latching element which is connected to the carrier element and which, when being arranged in a latching position, is adapted to latch with a complementary third holding element provided on an armrest of at least one of the plurality of seats in order to lock the armrest in both the deployed position and the stowed position of the armrest, the third latching element being biased into the latching position of the third locking mechanism; and wherein the first locking mechanism comprises a plurality of first locking elements and a plurality of first latching elements, each first locking element interacting with an associated first latching element and each pair of a first locking element and a respective first latching element being associated with one of the plurality of backrests of the plurality of seats, wherein the first locking elements are coupled to each other by a respective coupling element such that all first locking elements are movable between the locking position and the unlocking position of the respective first locking element simultaneously.

14. The aircraft foldable seat bench according to claim 13:
wherein the carrier arrangement comprises a plurality of rear legs,
wherein the second locking mechanism comprises an actuator handle which is connected to the second latching element via a first connecting element such that, upon actuation of the actuator handle, the second latching element is unlatched from the second holding element so as to unlock the rear legs and to thus allow a movement of the rear legs relative to the carrier element between the unfolded position and the folded position,
wherein the second locking mechanism comprises a plurality of second latching elements and a plurality of second holding elements, each second latching element interacting with an associated second holding element and each pair of a second latching element and a respective second holding element being associated with one of the plurality of rear legs, wherein all second latching elements are connected to the actuator handle via respective first connecting elements such that all second latching elements are movable between a latching position in which each of the respective second latching elements locks the associated rear leg and an unlatching position in which each of the respective second latching elements releases the associated rear leg simultaneously,
wherein the second locking mechanism further comprises a plurality of further second latching elements and a plurality of further second holding elements, each further second latching element interacting with an associated further second holding element and each pair of a further second latching element and a respective further second holding element being associated with one of the second leg portions of the plurality of rear legs, wherein all further second latching elements are connected to the actuator handle via a respective second further connecting element such that all further second latching elements are movable between a latching position in which each of the respective further second latching elements locks the associated second leg portion and an unlatching position in which each of the respective further second latching elements releases the associated second leg portion simultaneously.

15. An aircraft foldable seat bench comprising:
a plurality of seats, wherein each seat of the plurality of seats comprises a seat area, a backrest, and an armrest;
a carrier arrangement comprising;
a carrier element carrying the plurality of seats;
a front leg formed in one piece and pivotably connected to the carrier element at a first end and is pivotably mounted on an aircraft floor at an opposite end; and
a foldable rear leg comprising a first leg portion that is pivotably connected to the carrier element at a first end of the first leg portion, and a second leg portion that is pivotably connected at a first end of the second leg portion to a second end of the first leg portion,
wherein the rear leg is pivotably mounted on the aircraft floor by a second end of the second leg portion;
a first locking mechanism which, in a locking state, is adapted to lock a backrest of at least one of the seats in both a deployed position and a stowed position of the respective backrest;
a second locking mechanism which, in a locking state, is adapted to lock the rear leg of the carrier arrangement in both an unfolded position and a folded position; and
a third locking mechanism which, in a locking state, is adapted to lock an armrest of at least one of the seats in both a deployed position and a stowed position of the armrest;
wherein the backrest of each seat is movable relative to the carrier element between the deployed position in which the backrest extends at an angle of approximately 70° to 110° relative to the respective seat area and the stowed position in which the backrest extends at an angle of approximately 0° to 20° relative to the respective seat area, and
wherein the rear leg is movable from the unfolded position to the folded position by pivoting the second leg portion and the front leg in opposite directions,
wherein the carrier element is at a first distance from the aircraft floor in the unfolded position, and the carrier element is at a second distance from the aircraft floor in the folded position, the second distance from the aircraft floor being smaller than the first distance from the aircraft floor,
wherein the armrest of each seat is movable relative to the carrier element between a deployed position in which the respective armrest is arranged at a first distance from the carrier element and a stowed position in which the respective armrest is arranged at a second distance from the carrier element, wherein the second distance from the carrier element is smaller than the first distance from the carrier element,
wherein the backrests of the plurality of seats are movable relative to the carrier element between the deployed position and the stowed position of the respective backrest independently from each other, and
wherein the armrests of the plurality of seats are movable relative to the carrier element between the deployed position and the stowed position of the respective armrest independently from each other.

* * * * *